United States Patent
Yano et al.

[11] Patent Number: 6,068,340
[45] Date of Patent: May 30, 2000

[54] SEAT BELT DEVICE

[75] Inventors: Hideaki Yano; Keisuke Narimatsu; Tetsuya Hamaue, all of Tokyo, Japan

[73] Assignee: Takata Corporation, Tokyo, Japan

[21] Appl. No.: 09/318,256

[22] Filed: May 25, 1999

[30] Foreign Application Priority Data

Jun. 1, 1998 [JP] Japan .................................. 10-151398
Sep. 10, 1998 [JP] Japan .................................. 10-256834

[51] Int. Cl.[7] ........................... A47C 31/00; B60R 22/00
[52] U.S. Cl. ................. 297/478; 297/216.13; 242/384.4
[58] Field of Search ....................... 297/216.13, 216.14, 297/474, 478, 480; 242/384.4

[56] References Cited

U.S. PATENT DOCUMENTS

| | | | |
|---|---|---|---|
| 4,610,480 | 9/1986 | Yamada et al. ......................... | 297/478 |
| 5,716,102 | 2/1998 | Ray et al. ............................... | 297/478 |
| 5,906,327 | 5/1999 | Chamings .............................. | 297/480 |
| 6,015,164 | 1/2000 | Yano ...................................... | 297/478 |

*Primary Examiner*—Anthony D. Barfield
*Attorney, Agent, or Firm*—Kanesaka & Takeuchi

[57] ABSTRACT

A seat belt retractor 80 is attached to a seat back 14 and a cable advancing and retreating mechanism 20 is attached to a portion where a supporting arm 12 and a shaft 18 for inclining the seat back 14 are connected to each other. The supporting arm 12 projects from a seat cushion 10 for supporting the seat back 14. Corresponding to the inclination of the seat back 14, a cable 70 laid between the cable advancing and retreating mechanism 20 and the seat belt retractor 80 is advanced or retreated from/into the cable advancing and retreating mechanism 20. The attitude of the acceleration sensor 92 attached to the seat belt retractor 80 is controlled by advancing or retreating the cable 70 so that the acceleration sensor 92 always stands perpendicularly.

7 Claims, 18 Drawing Sheets

SEAT BELT DEVICE

BACKGROUND OF THE INVENTION AND RELATED ART STATEMENT

The present invention relates to a seat belt device for protecting a vehicle occupant, particularly to a seat belt device in which a seat belt retractor is incorporated in a seat back. More particularly, the present invention relates to the seat belt device in which an acceleration sensor always stands vertically at any reclining angle of the seat back.

As well known, a seat belt device restrains an occupant to a vehicle seat with a webbing unwound from a real of a retractor in order to protect the occupant when the vehicle comes into collision. In this seat belt device, a locking mechanism is actuated to stop the reel to rotate when deceleration applied to the vehicle in the horizontal direction exceeds a predetermined value. An acceleration sensor for detecting the deceleration has a sensor weight capable of tilting which tilts to a rolling-over side due to the deceleration in the horizontal direction.

A seat belt retractor may be incorporated in a seat back, whereby, a webbing fits well the occupant, at any angle of inclination of the seat back.

The seat belt retractor incorporated in the seat back requires to be provided with a mechanism for controlling the acceleration sensor to stand vertically at any angle of inclination of the seat back. A mechanism for controlling the acceleration sensor disclosed in the U.S. Pat. No. 5,716,102 has a pulley attached to a portion where the seat back and the seat cushion are connected to each other, and a cable one of ends of which is wound onto a pulley integrated with the acceleration sensor, so that the cable rotates the pulley integrated with the acceleration sensor according to the pivotal movement of the seat back in the rearward incline direction to stand the sensor vertically.

The cable is a release style cable having a sheath-like outer tube and is able to deliver not only a tension but also a pressure.

It is hardly possible to install the seat belt device of the U.S. Pat. No. 5,716,102 in a vehicle, since even a minute error of a length of the cable or the outer tube brings a large drift of the acceleration sensor from the vertical direction.

OBJECT AND SUMMARY OF THE INVENTION

It is an object of the present invention to provide a seat belt device which ensures that the acceleration sensor always stands vertically although a cable or an outer tube has an error in length thereof.

A seat belt device of a first aspect of the present invention has a seat belt retractor having a reel for winding a seat belt, a locking mechanism for locking the reel to rotate in the seat belt withdrawing direction, an acceleration sensor for activating the locking mechanism, and a retractor frame in which the reel, the locking mechanism, and the acceleration sensor are assembled. The seat belt retractor is incorporated in a seat back. The acceleration sensor is supported to the retractor frame in such a manner as to pivot about a horizontal axis, and combined with a rotor for controlling the acceleration sensor to stand vertically. A cable advancing and retreating mechanism which advances or retreats a cable corresponding to the inclination of the seat back is attached to a portion where the seat back and the seat cushion are connected to each other. The cable advancing and retreating mechanism and the rotor are linked together by the cable, so that the acceleration sensor always stands vertically at any angle of inclination of the seat back. The cable advancing and retreating mechanism has a pinion which rotates corresponding to the inclination of the seat back and a rack gearing into the pinion. The rack consists of a main rack gearing into the pinion and a sub rack attached to the main rack in such a manner to be positioned adjustably along the length of the main rack. The cable is joined to the sub rack.

In this seat belt device, the rack (the combined main and sub racks) is advanced or retreated corresponding to the inclination of the seat back, and the rack rotates, through the cable, the rotor combined to the acceleration sensor so that the acceleration sensor stands vertically at any inclination angle of the seat back.

In the device of the first aspect, the rack consists of the main rack and the sub rack so that an error of the length of the cable or the outer tube can be corrected by adjusting the position of the sub rack on the main rack to stand the acceleration sensor in the precisely vertical direction.

A seat belt device of a second aspect of the present invention has a seat belt retractor comprising a reel for winding a seat belt, a locking mechanism for locking the reel to rotate in the seat belt withdrawing direction, an acceleration sensor for activating the locking mechanism, and a retractor frame in which the reel, the locking mechanism, and the acceleration sensor are assembled. The seat belt retractor is incorporated in a seat back. The acceleration sensor is supported to the retractor frame in such a manner as to pivot about the horizontal axis, and combined with a rotor for controlling the acceleration sensor to stand vertically. A cable advancing and retreating mechanism which advances or retreats a cable corresponding to the inclination of the seat back is attached to a portion where the seat back and the seat cushion are connected to each other. The cable advancing and retreating mechanism and the rotor are linked together by the cable, so that the acceleration sensor always stands vertically at any tilt angle of the seat back. The cable advancing and retreating mechanism has a fixed pinion and a rack which gears into and is moved by the pinion corresponding to the inclination of the seat back. The cable is attached to the rack in such a manner to be positioned adjustably along the length of the rack.

In this seat belt device, the rack is advanced or retreated corresponding to the inclination of the seat back and rotates the rotor combined to the acceleration sensor through the cable to stand the acceleration sensor vertically at any tilt angle of the seat back.

In the device of the second aspect, it is possible to correct an error of the length of the cable or the outer tube to stand the acceleration sensor precisely in the vertical direction due to adjusting the position where the cable is attached to the rack.

BRIEF DESCRIPTION OF THE DRAWINGS

FIG. 17a is a side view of a seat with the seat back standing almost perpendicularly and FIG. 17b is a side view of the cable advancing and retreating mechanism in the same state as FIG. 17a;

FIG.18a is a side view of the seat with the seat back inclined rearward and FIG. 18b is a side view of the cable advancing and retreating mechanism in the same state as FIG. 18a; and FIG. 19a is a side view of the seat with the seat back inclined forward and FIG.19b is a side view of the cable advancing and retreating mechanism in the same state as FIG. 19a.

DESCRIPTION OF PREFERRED EMBODIMENTS

Hereinafter, an embodiment of the present invention will be described with reference to the attached FIG. 1 through FIG. 12.

Figure 1:
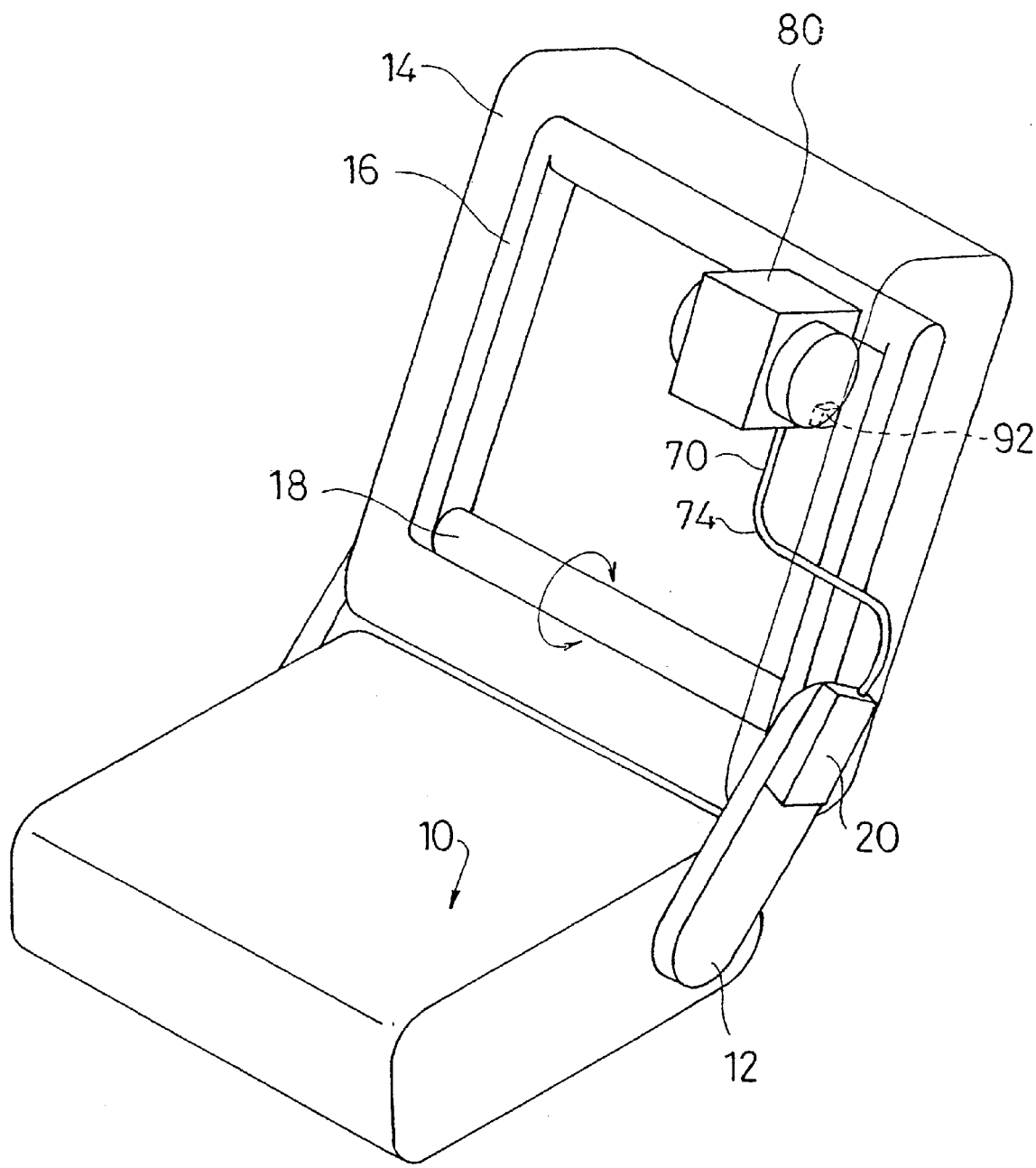
FIG. 1 is a perspective view of a seat provided with a seat belt device according to an embodiment.

As shown in FIG. 1, support arms 12 are fixed to both sides of a seat cushion 10. A seat back 14 is supported in such a manner that the seat back 14 can be pivot relative to the support arms 12. The seat back 14 is provided with a seat back frame 16 including a pivot shaft 18. The pivot shaft 18 is supported by the support arms 12 rotatably. A cable advancing and retreating mechanism 20 is attached to a portion where the pivot shaft 18 and one of the support arms 12 are connected to each other.

A cable 70 is laid between a seat belt retractor 80 fixed to the seat back frame 16 and the cable advancing and retreating mechanism 20.

Figure 2:
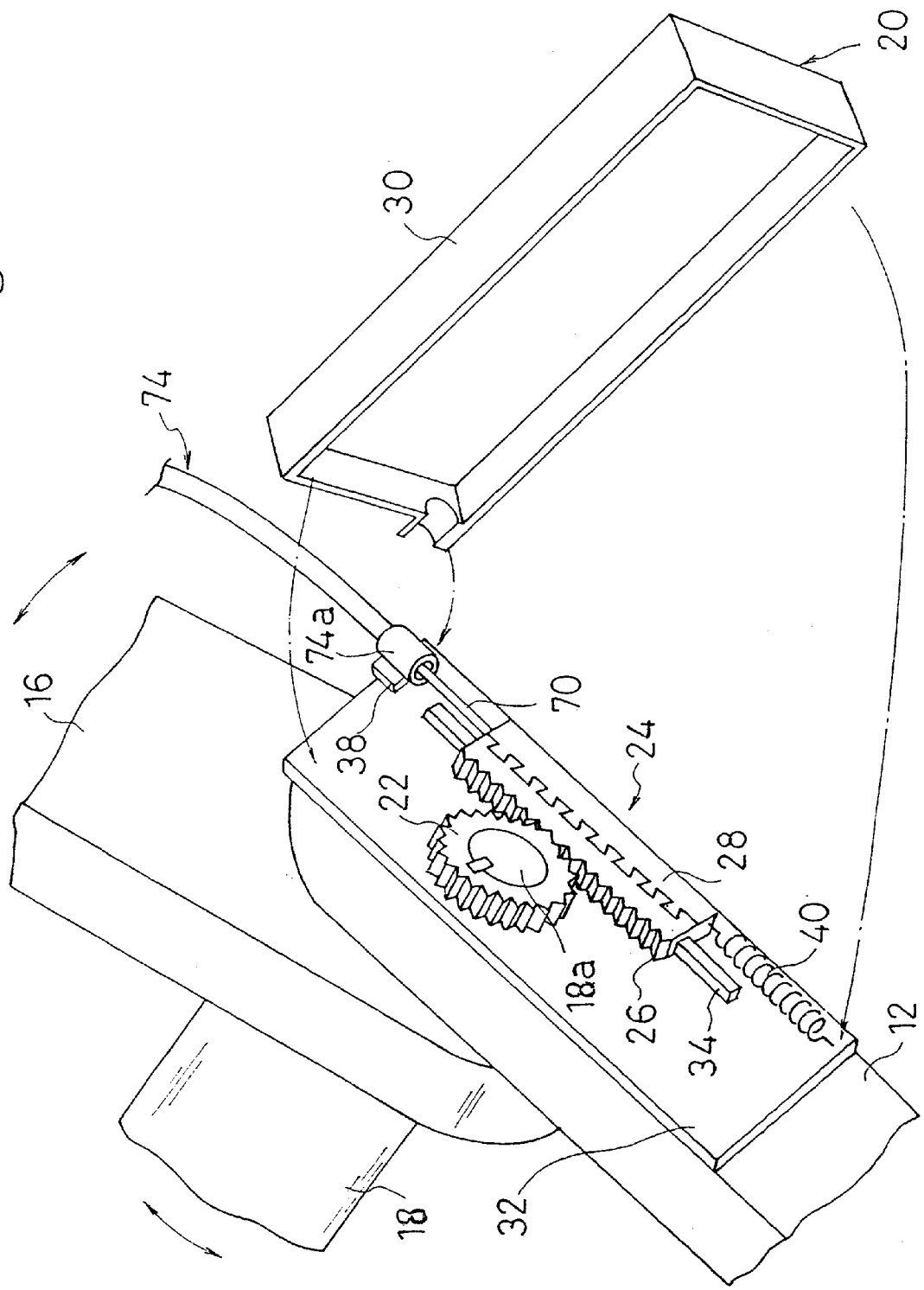
FIG. 2 is a perspective view of a cable advancing and retreating mechanism.
Figure 3:
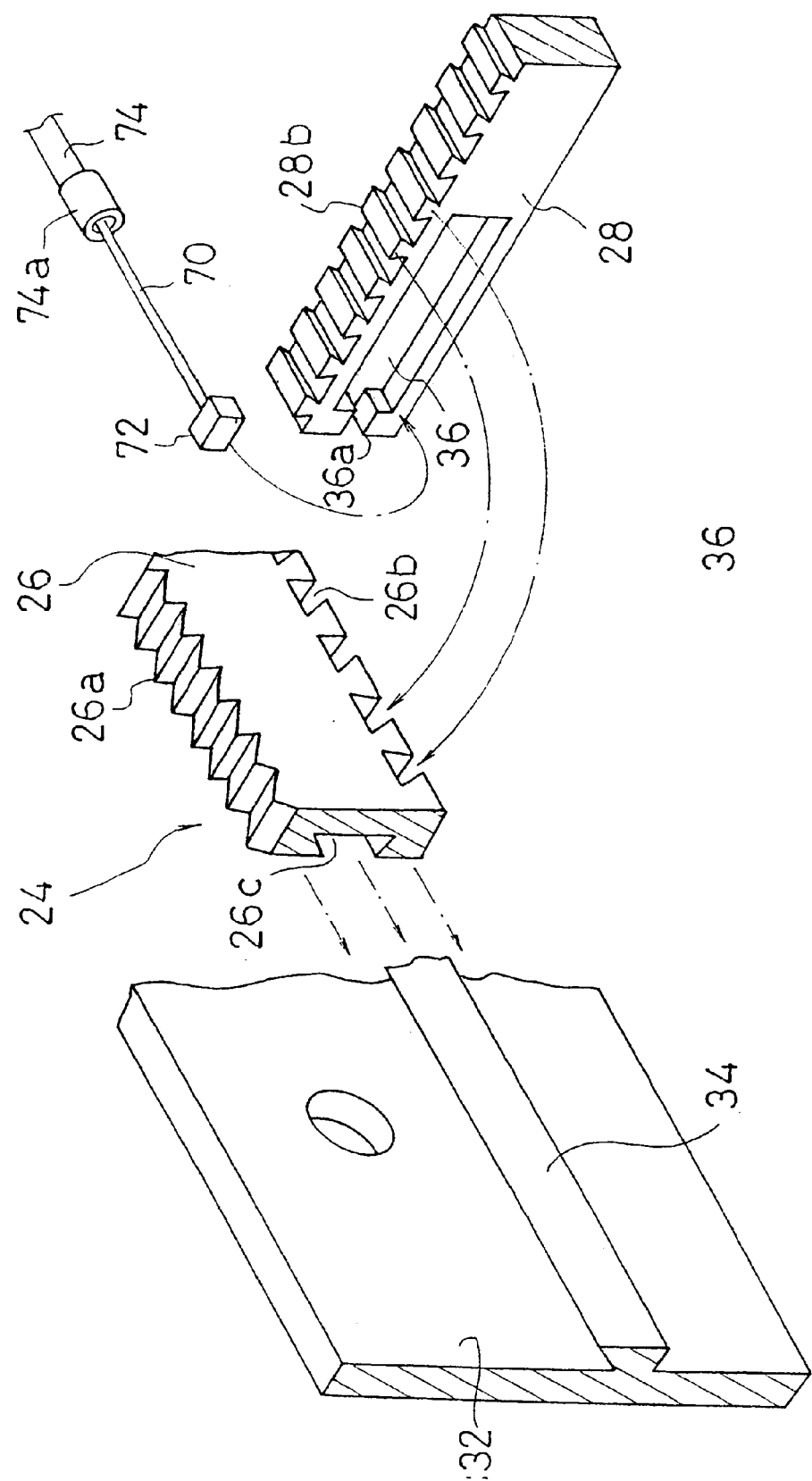
FIG. 3 is an exploded perspective view of the cable advancing and retreating mechanism.

As shown in FIG. 2 and FIG. 3, the cable advancing and retreating mechanism 20 has a pinion 22 fixed to a tip 18a of the pivot shaft 18, a rack 24 gearing into the pinion 22, a casing bottom 32 and a casing cover 30 enclosing the pinion 22 and the rack 24.

The rack 24 consists of a main rack 26 and a sub rack 28. The main rack 26 has arranged cogs 26a gearing into the pinion 22 and cogs 26b engaging cogs 28b on the sub rack 28.

The cogs 26b and 28b are shaped into an inverse trapezoid widening toward a tip thereof so that the main rack 26 and the sub rack 28 are engaged and prevented from slipping off from each other.

The main rack 26 is provided with a guide groove 26c engaging a ridge 34 provided on the casing bottom 32. The ridge 34 and the guide groove 26c have an inverse trapezoid shaped cogs section so that the main rack 26 is prevented from slipping off from the casing bottom 32 due to engaging the ridge 34 and the guide groove 26c.

The sub rack 28 is provided with a groove 36 wherein an end block 72 attached to an end of the cable 70 is accomodated slidably. The end block 72 prevented to slide out of the groove 36 by an end 36a of the groove 36. When the rack 24 (sub rack 28) is slid against the tension load on the cable 70, the cable 70 is pulled and moved to an outward direction of a tube 74.

The casing bottom 32 is provided with a fixing portion 38 where an end 74a of the tube 74 is fixed.

The cable 70 is inserted into the tube 74 so that the cable 70 can deliver both the tension and the pressure to a rotor 126 of a seat belt retractor 80.

An extension spring 40 intervenes between the sub rack 28 and the casing bottom 32 so that the extension spring 40 pulls the sub rack 28 softly always in order to prevent clacks caused due to the clearance.

The reason why the main rack 26 and the sub rack 28 are used to constitute the rack 24 as mentioned above is that the cable 70 can lay suitably without slack between the seat belt retractor 80 and the cable advancing and retreating mechanism 20 regardless of an error of the length of the cable 70 and the tube 74.

The seat belt retractor 80, the casing bottom 32 of the cable advancing and retreating mechanism 20, the pinion 22 and the main rack 26 are incorporated in the seat, the cable 70 is connected to the sub rack 28, and the end 74a of the tube 74 is fixed to the tube fixing portion 38. After finding out a portion of the sub rack 28 where the rotor 126 stand an acceleration sensor 92 vertically, the cogs 28b of the sub rack 28 are engaged with the cogs 26b of the main rack 26. After that, the casing cover 30 is put over and fixed.

Figure 4:
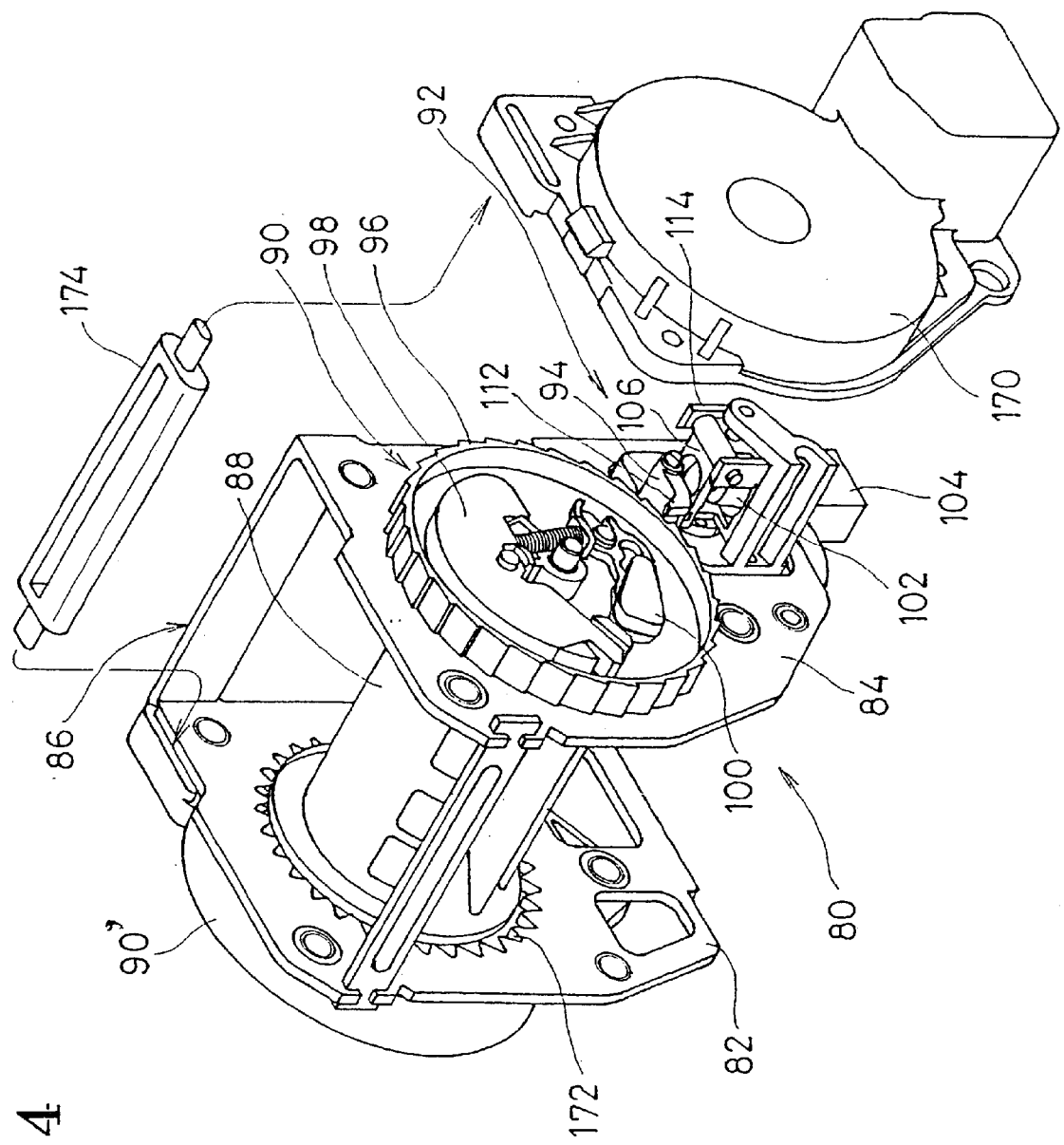
FIG. 4 is an exploded perspective view of a seat belt retractor.
Figure 5:
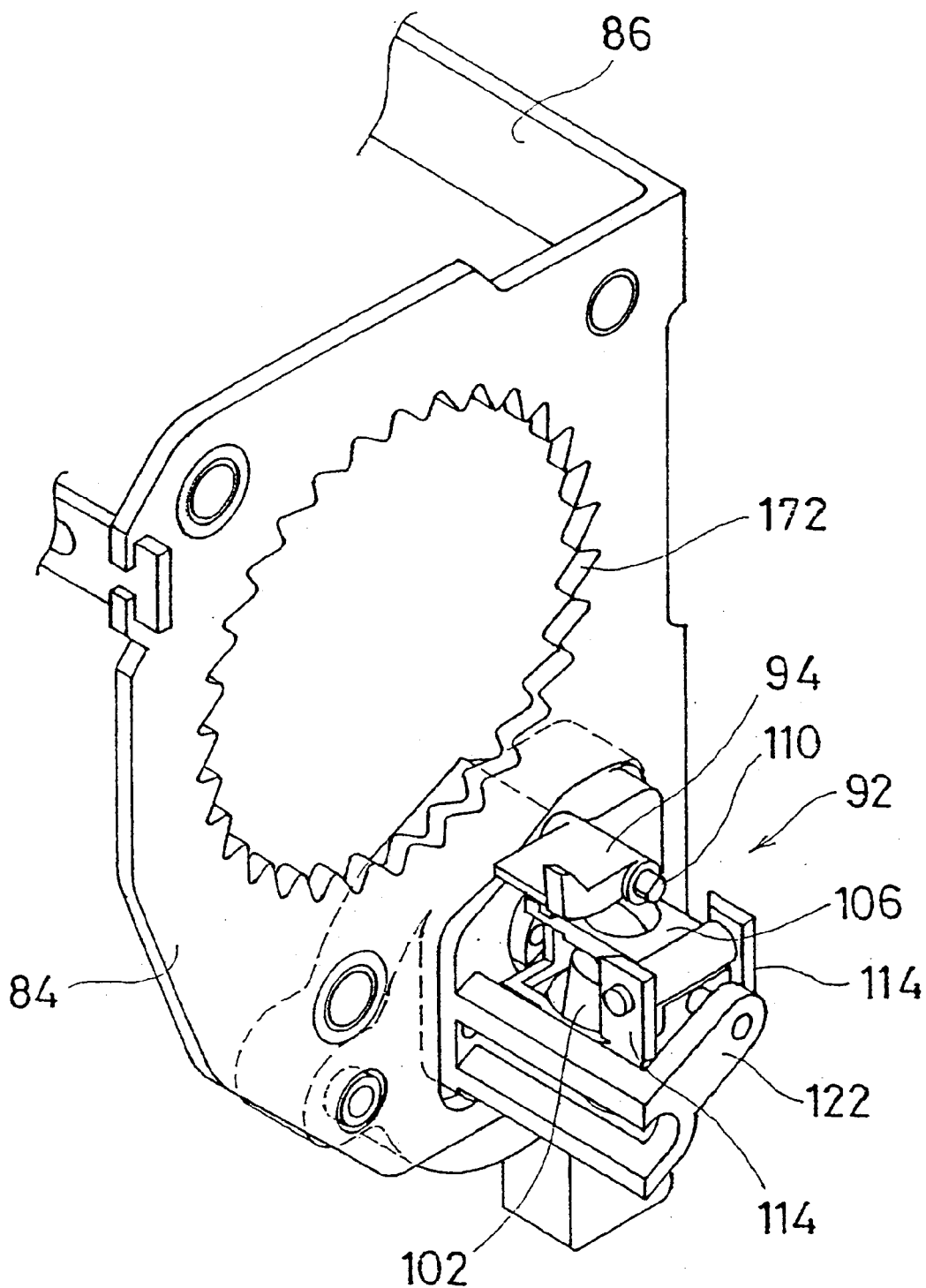
FIG. 5 is a perspective view showing a state of fixing an acceleration sensor of the seat belt retractor.

As shown in FIG. 4, the seat belt retractor 80 has a U-like retractor frame comprising a pair of frame sides 82, 84 and a frame back 86 connecting the frame sides 82, 84. A reel 88 onto which a webbing (not shown) is wound is laid between the frame sides 82 and 84. Mounted on the outer surface of the frame side 82 is a spring casing 90' which accommodates a spring biasing the reel 88 in the webbing winding direction. Mounted on the outer surface of the frame side 84 is a locking mechanism 90 for locking the rotation of the reel 88.

The locking mechanism 90 comprises an acceleration sensor 92, a ratchet wheel 96 engaging with a second arm 94 of the acceleration sensor 92, an inertial member 98 arranged in the ratchet wheel 96, and a link 100 for interlocking the ratchet wheel 96 with pawls (not shown) of the locking mechanism 90.

The acceleration sensor 92 comprises a sensor casing 104 accommodating a sensor weight 102, a first arm 106 pivotaly supported in the sensor casing 104, and the second arm 94 which is overlaid on the first arm 106 and is pivotaly supported by a shaft 110 of a holder casing 108.

Figure 6:
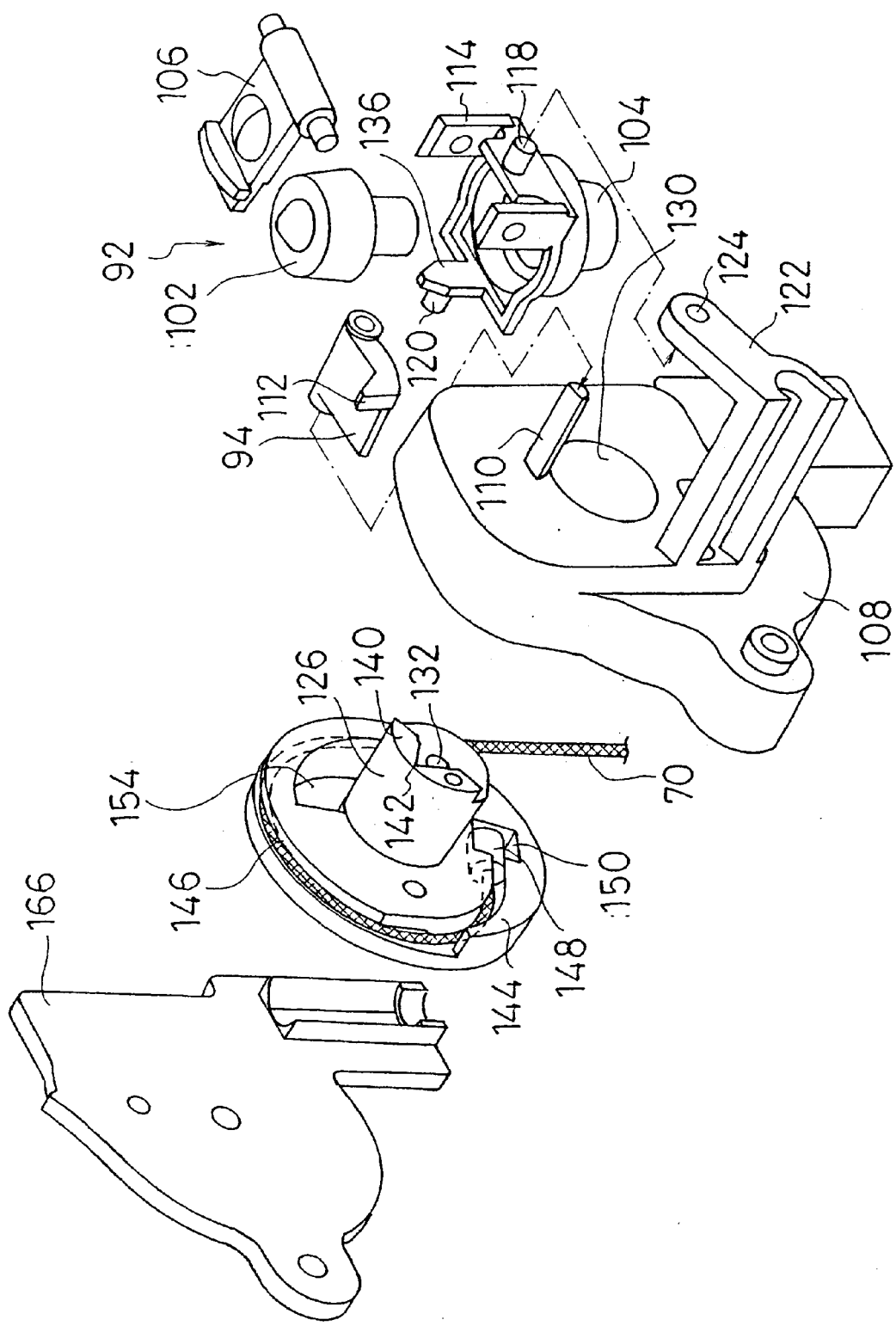
FIG. 6 is an exploded perspective view showing the structure of the acceleration sensor and the structure of a holder casing.

As shown in FIG. 6, the sensor weight 102 is held in the sensor casing 104 in such a manner that the sensor weight 102 can tilt from a vertical attitude. When the sensor weight 102 tilts, the first arm 106 pivots upwards and then the second arm 94 also pivots upwards so that a pawl 112 of the second arm 94 engages with one of cogs formed on the outer periphery of the ratchet wheel 96. The first arm 106 is supported by a pair of holding members 114 standing from the sensor casing 104.

The sensor casing 104 is provided with a pair of shafts 118, 120 arranged coaxially. The shaft 118 is inserted into a hole 124 of a holding arm 122 of the holder casing 108. The holder casing 108 is provided with a rotor hole 130 into which an attitude control rotor 126 for the sensor casing 104 is inserted.

The rotor 126 is rotatably held in the rotor hole 130 and is provided with a hole 132 at the axial portion thereof. The shaft 120 of the sensor casing 104 is inserted into the hole 132.

The attitude control rotor 126 comprises an overhang 140 overhanging above a standing piece 136 of the sensor casing 104 at the axial direction. The overhang 140 is provided with an engaging recess 142 engaging the upper end of the standing piece 136. The shaft 120 projects from the side of the standing piece 136.

The engaging recess 142 is formed substantially in a triangle opening downward and the standing piece 136 has a pointed crown. There is slight play between the recess 142 and the crown of the standing piece 136 (in this embodiment, there is play of about 5° in the rotational direction of the standing piece 136) not just fitting with each other. This play can absorb errors due to the operation of the mechanism or the limitation of precision of parts or assembly. The play may be 3–8°, preferably 4–7°, and more preferably 4–6° around the axis of the hole 132.

A wheel 144 is integrated with the rotor 126. The wheel 144 onto which the upper end portion of the cable 70 is wound is rotatably accommodated in the holder case 108. The wheel 144 is provided with a cable groove 146 formed in the outer peripheral surface thereof, onto which the cable 70 is wound. The wheel 144 is also provided with an end block ditch 150 in which an upper end block 148 of the cable 70 is inserted. Furthermore, the wheel 144 is provided with a spring receiving slit 154 extending circumferentially.

Figure 7:
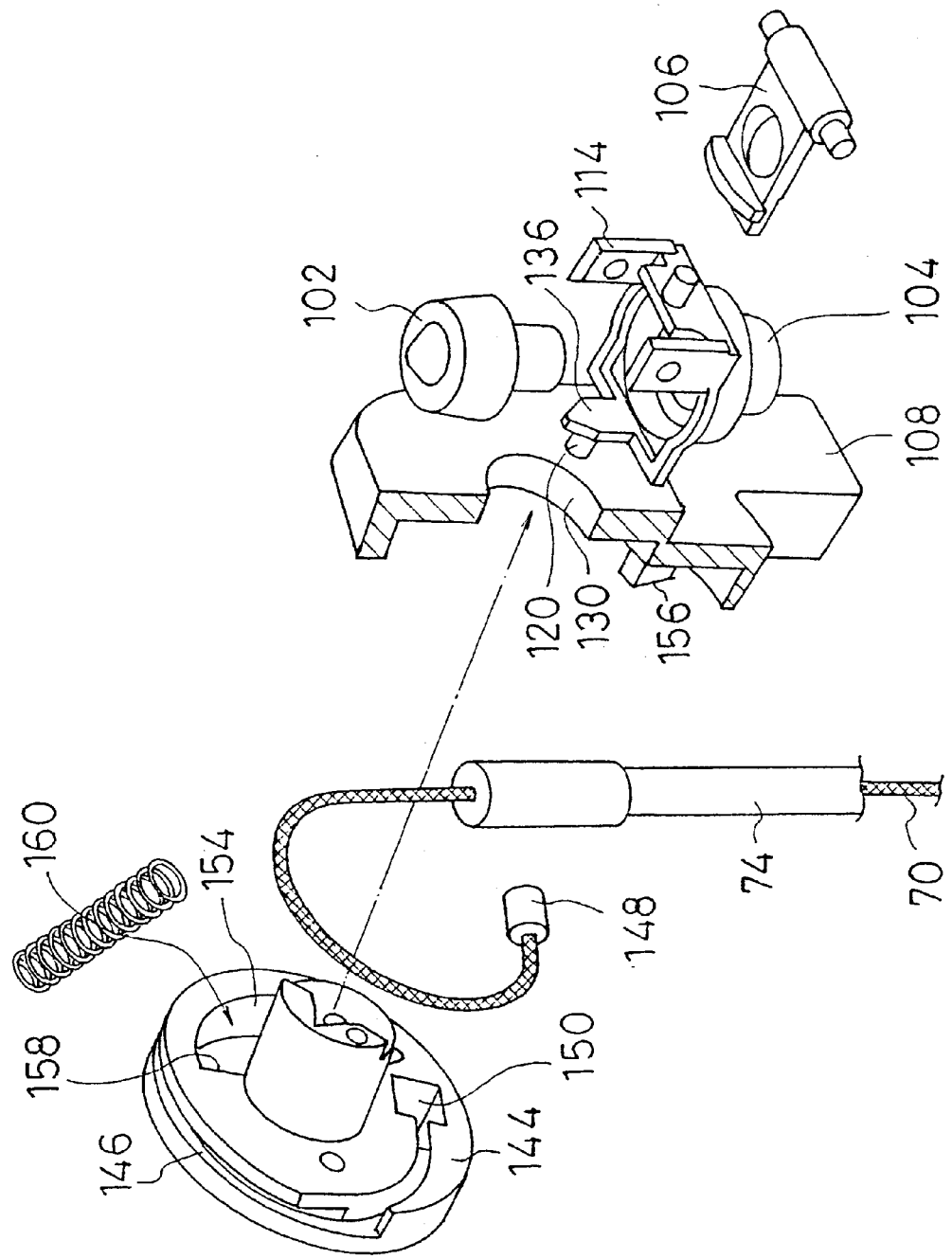
FIG. 7 is an exploded perspective view showing the structure of the acceleration sensor and the structure of the holder casing.
Figure 8:
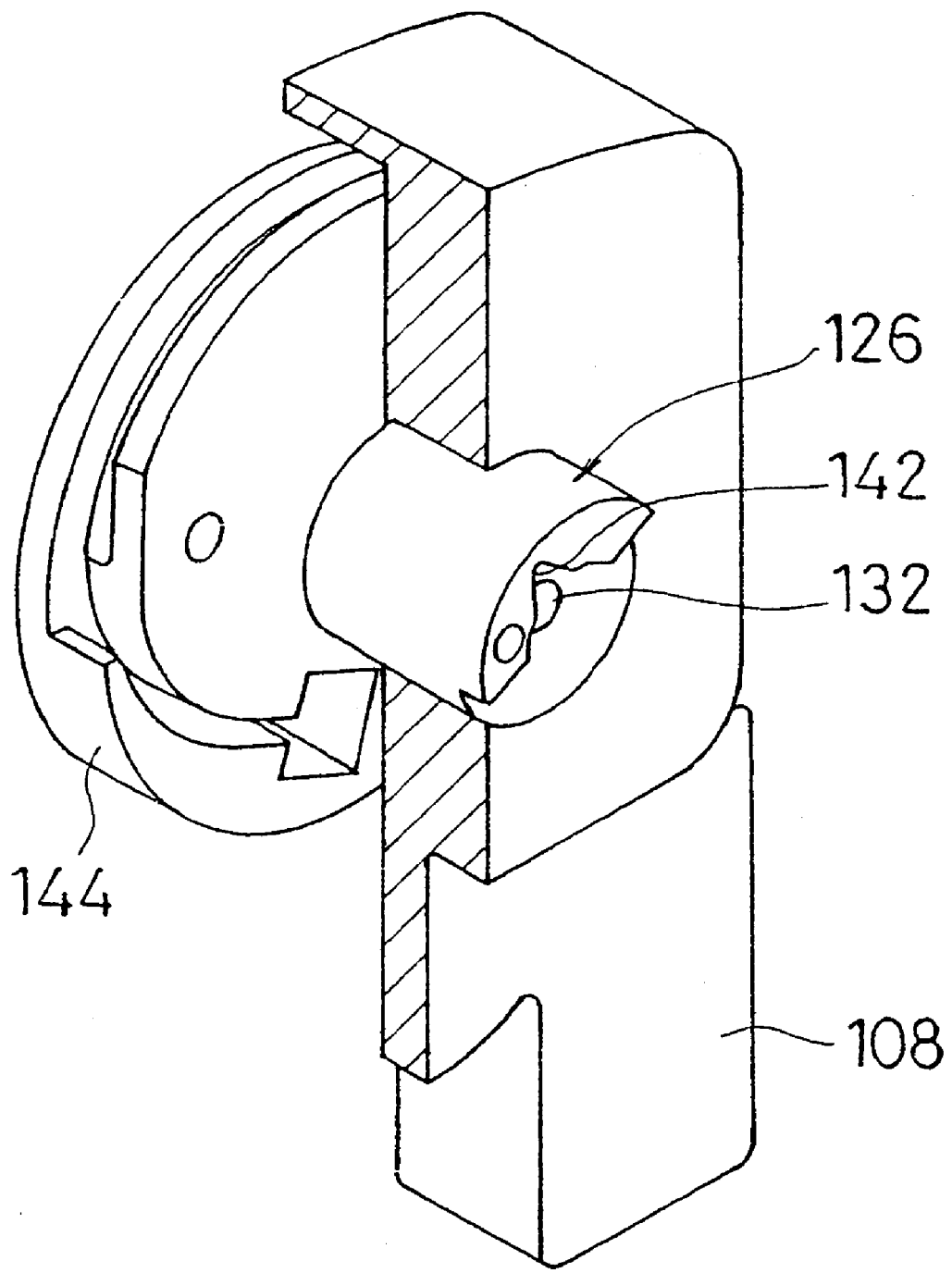
FIG. 8 is a sectional perspective view showing an attitude control mechanism of the acceleration sensor.
Figure 9:
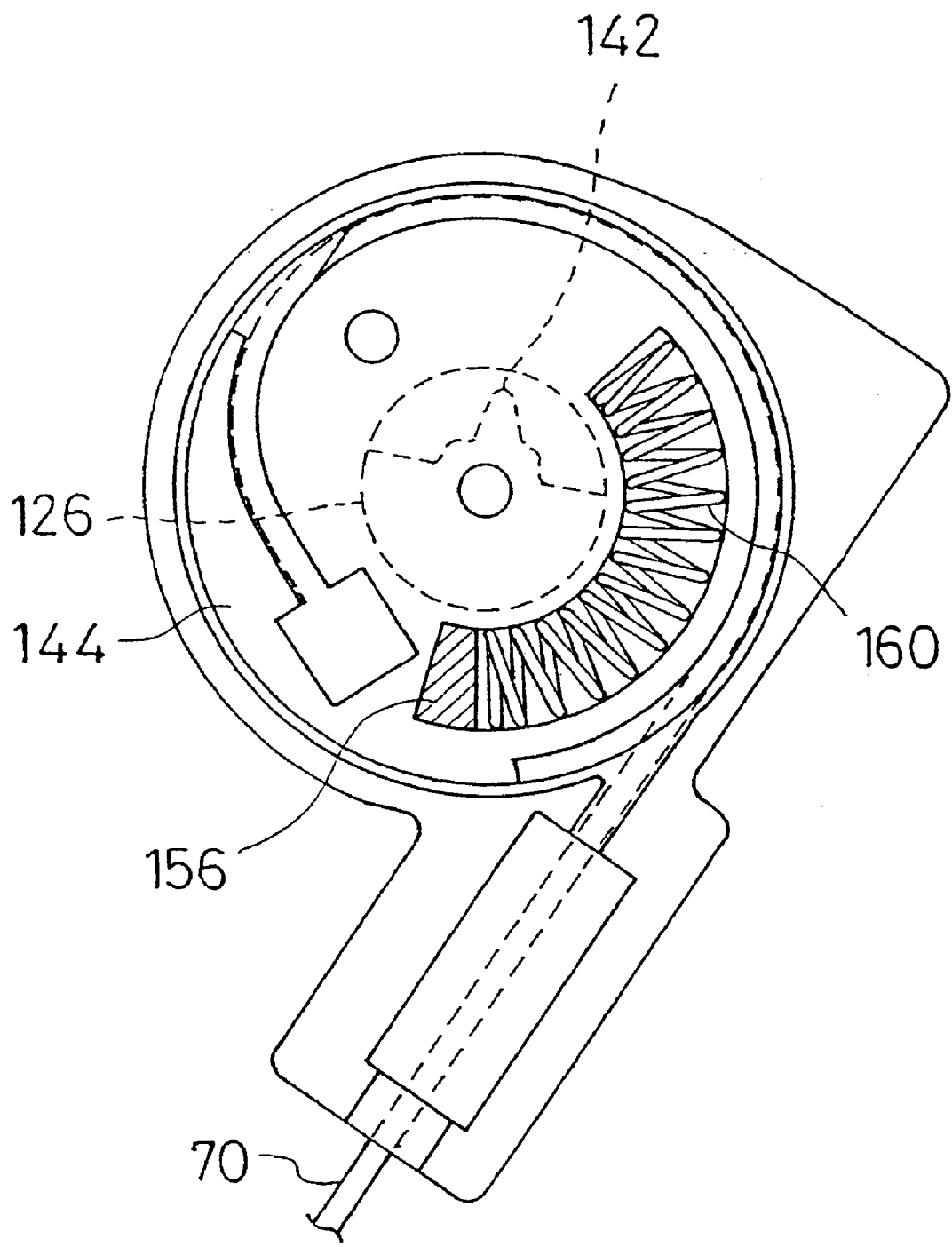
FIG. 9 is a side view of the attitude control mechanism.

As shown in FIG. 7, the holder casing 108 is provided with a projection 156 on the inner surface thereof which is inserted in the spring receiving slit 154. A return spring 160 is compressed between the projection 156 and a slit end 158 of the spring receiving slit 154. The return spring 160 receives the reaction force by the projection 156 to bias the wheel 144 in the counterclockwise direction in FIGS. 6 and 7.

The cable 70 is inserted into a cable tube 74 as shown in FIG. 7. The upper end of the cable tube 74 is fixed to the holder casing 108.

After the wheel 144 and the attitude control rotor 126 are assembled in the holder casing 108, a holder plate 166 is attached. After that, the holder casing 108 is fixed to the frame side 84 of the seat belt retractor 80 as shown in FIG. 4. Then, the cover 170 is attached to the frame side 84 in such a manner as to cover the locking mechanism 90 and the acceleration sensor 92.

When the acceleration sensor 92 is exerted with an acceleration in the horizontal direction exceeding a predetermined value, the sensor weight 102 tilts so as to raise the first arm 106 and the second arm 94 so that the pawl 112 engages with the ratchet wheel 96. Therefore, the ratchet wheel 96 is stopped from rotating in the webbing unwinding direction. Since the reel 88 intends to further rotate, the ends of the pawls (not shown) move outwardly by the link 100 and engage with respective ones of cogs 172 (FIGS. 4 and 5) formed in the frame sides 82, 84 so that the rotation of the reel 88 is stopped and the webbing is thereby prevented from withdrawing.

The reference numeral 174 in FIG. 4 designates a webbing guide for guiding the webbing withdrawn from the reel 88.

In this seat belt device, as shown in FIGS. 10a, 10b, 11a, 11b, 12a and 12b, the sensor casing 104 of the acceleration sensor 92 is held by the attitude control rotor 126 in such a manner as to always stand vertically even when the seat back 14 is inclined rearwardly.

Figure 10A:
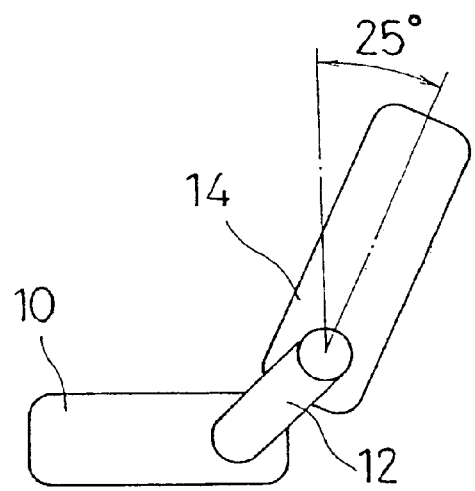
FIG. 10a is a side view of the seat and FIG. 10b is an exemplary side view showing the operation of the attitude control mechanism.
Figure 10B:
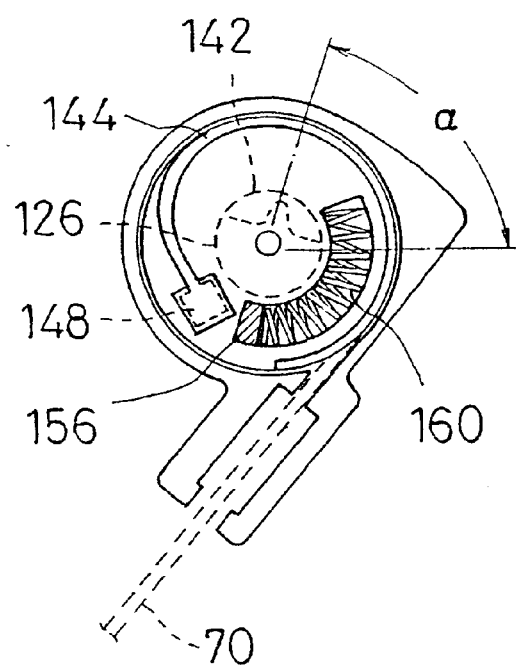
Figure 11A:
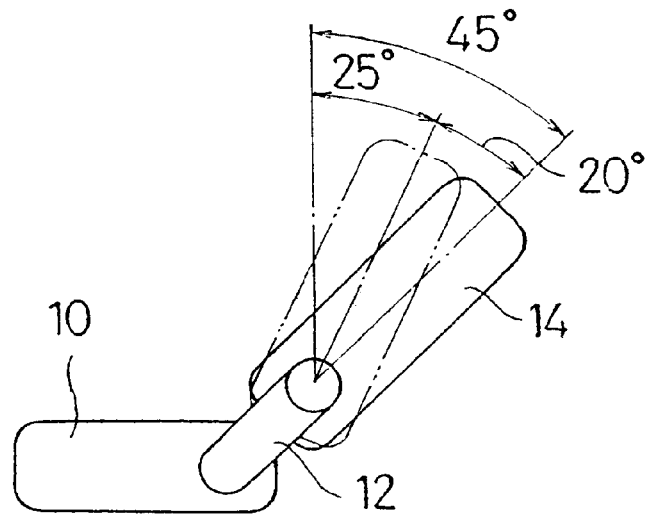
FIG. 11a is a side view of the seat and FIG. 11b is an exemplary side view showing the operation of the attitude control mechanism.
Figure 11B:
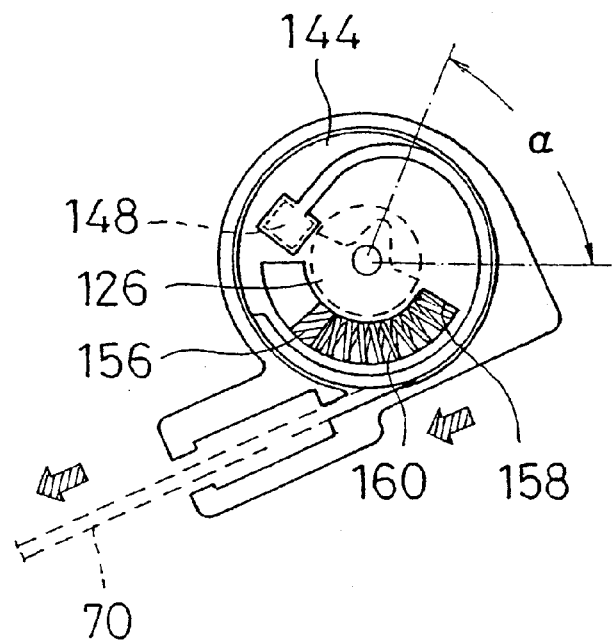

FIGS. 10a, 10b show the state where the seat back 14 is inclined rearwardly at 25° from the vertical direction. When the seat back 14 is further inclined rearwardly at 20° from the state of FIGS. 10a, 10b as shown in FIGS. 11a, 11b, the cable 70 is drawn by the rack 24 of the cable advancing and retreating mechanism 20 and the wheel 144 at the seat belt retractor side, where the upper end of the cable 70 is wound, rotates in the clockwise direction in FIGS. 11a, 11b. As the wheel 144 rotates, the attitude control rotor 126 integrated with the wheel 144 thus rotates, and the standing piece 136 engaging with the engaging recess 142 also rotates in the same direction. Therefore, the sensor casing 104 is directed vertically so that the sensor weight 102 is held in the vertical standing attitude as well as the sensor casing 104.

Figure 12A:
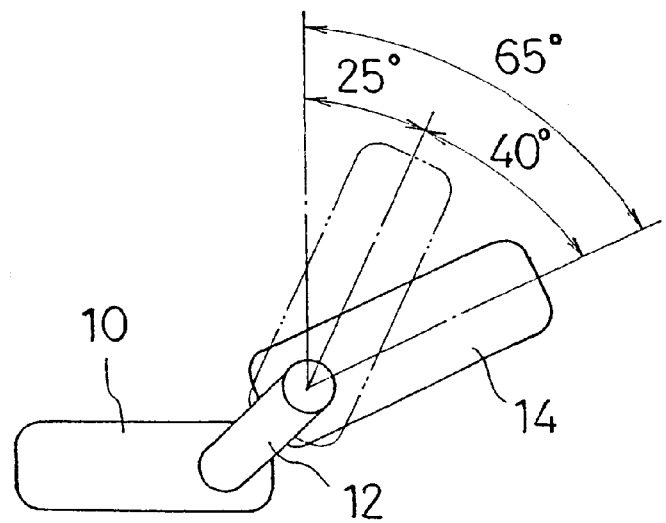
FIG. 12a is a side view of the seat and FIG. 12b is an exemplary side view showing the operation of the attitude control mechanism.
Figure 12B:
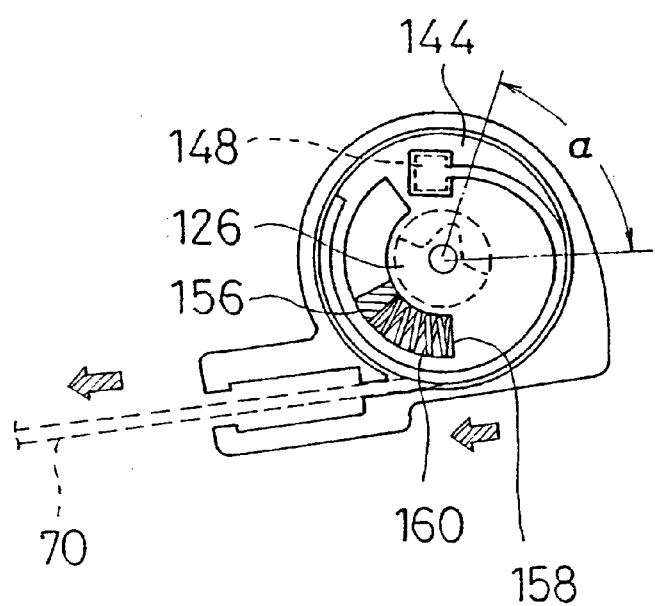

As the seat back 14 is further inclined rearwardly from the state of FIGS. 11a, 11b as shown in FIGS. 12a, 12b, the cable 70 is further drawn by the rack 24 so that the wheel 144 further rotates. Thus, the attitude control rotor 126 further rotates and the sensor casing 104 with the standing piece 136 further rotates so that the sensor weight 102 is held in the vertical standing attitude as well as the sensor casing 104.

As mentioned above, even when the seat back 14 is inclined at any angle, the sensor casing 104 rotates in such a manner as to hold the sensor weight 102 in the perpendicular standing attitude. Therefore, the locking operation of the seat belt retractor 80 is not performed even when the seat back 14 is inclined in any way unless the acceleration exceeding the predetermined value is exerted on the acceleration sensor 92.

When the seat back 14 is returned to the normal position from the states of FIGS. 11a, 11b, 12a and 12b, the cable 70 is advanced out of the cable advancing and retreating mechanism 20 and the wheel 144 rotates in the counterclockwise direction of FIGS. 10b, 11b and 12b. Then, the rotor 126 rotates in the clockwise direction and the sensor casing 104 with the standing piece 136 rotates in the same direction so that the sensor casing 104 always stands vertically.

As the seat back 14 is inclined rearward, the slit end 158 of the wheel 144 moves closer to the projection 156 of the holder casing 108 as shown in FIGS. 11b and 12b so that the return spring 160 is pressurized.

Conversely, when the seat back 14 is returned to the standing position shown in FIG. 10a from the position shown in FIG. 11a or FIG. 12a, the wheel 144 is pressed by the return spring 160 so as to smoothly rotate in the counterclockwise direction of FIGS. 11b and 12b.

The end block 72 can slide within the groove 36 toward the opposite end of the end 36a. When the seat back 14 stands in the vertical direction, the end block 72 engages the end 36a. When the seat back 14 is inclined forward from the vertical direction, the end block 72 slides in the slit 36 toward the opposite end of the end 36a relatively. Therefore, in case that the seat back 14 is inclined to be laid on the cushion 12, the cable 70 is not advanced out of the cable advancing and retreating mechanism 20 so that the seat back 14 can be laid on the cushion 12 without any obstacle.

Hereinafter, another embodiment of the present invention will be described with reference to the attached FIG. 13 through FIG. 19b.

In this embodiment, each support arm 12 is also fixed to each side of the seat cushion 10. The seat back is supported in such a manner that the seat back frame 16 pivots relative to the support arm 12. A cable advancing and retreating mechanism 200 is attached to a portion where the seat back frame 16 and one of the support arms 12 are connected to each other. The cable 70 is laid between the seat belt retractor 80 fixed to the seat back frame 16 (not shown in FIG. 13 through FIG. 19) and the cable advancing and retreating mechanism 200.

The cable advancing and retreating mechanism 200 comprises a fixing piece 210 fixed to the support arm 12, a gear holder 220 attached to the seat back frame 16, a rack 230 and a pinion 240 contained in the gear holder 220, a gear holder lid 260 covering the gear holder 220 with intervention of a slip plate 250.

Figure 13:
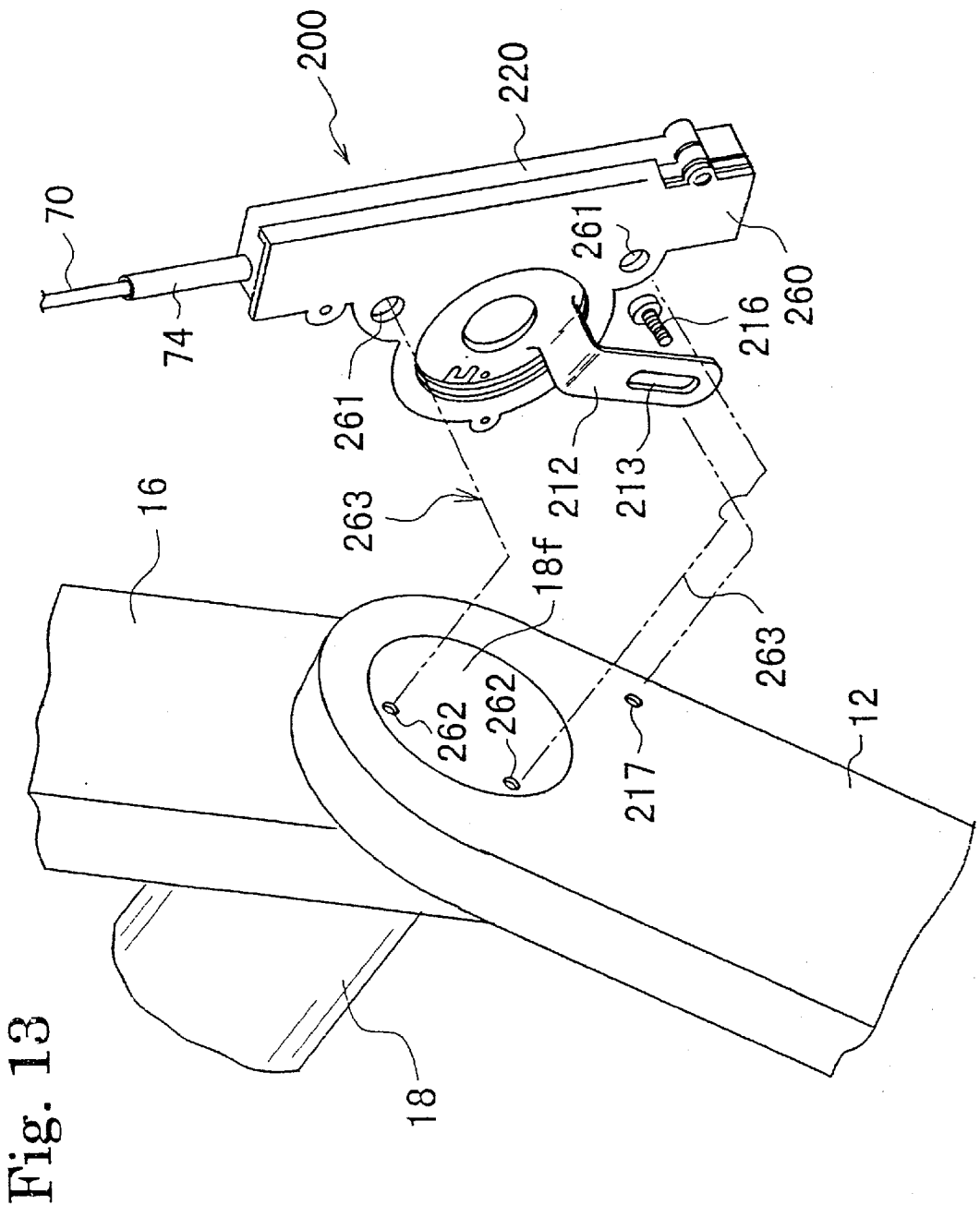
FIG. 13 is an exploded perspective view of an attitude control mechanism according to another embodiment.
Figure 14:
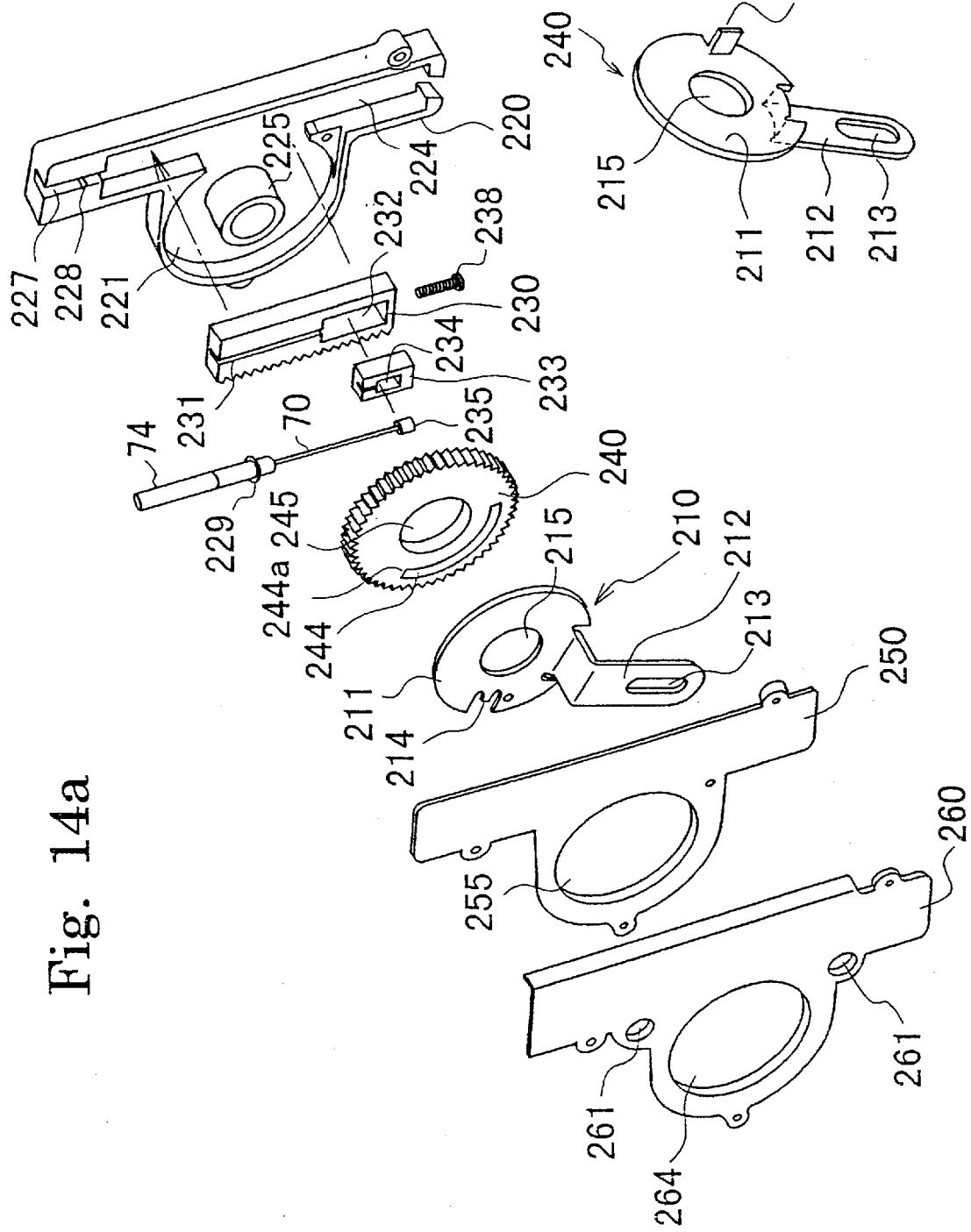
FIG. 14a is an exploded perspective view of a cable advancing and retreating mechanism constituting the attitude control mechanism of FIG. 13
FIG. 14b is an perspective view from the rear side of a fixing piece 210.
Figure 15:
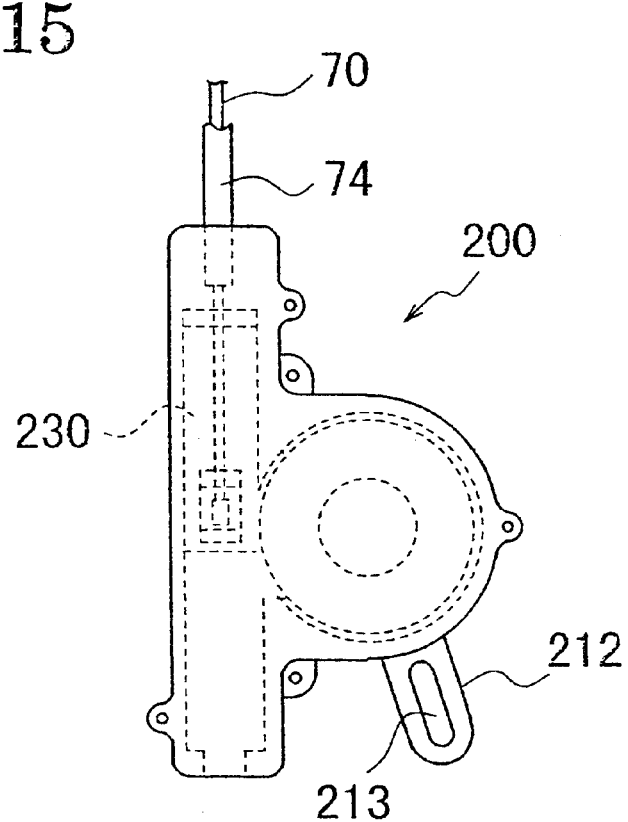
FIG. 15 is a front view of the cable advancing and retreating mechanism of FIG. 14.
Figure 16:
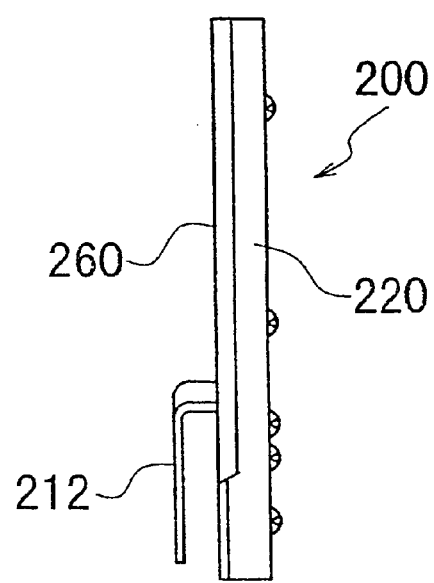
FIG. 16 is a side view of the cable advancing and retreating mechanism of FIG. 15.

The fixing piece 210 comprises an annulus disk portion 211, a bracket 212 extending radially from the disk portion 211, a slot 213 provided on the bracket 212, a pin 214 formed like a crow which is bent and stood up from the bracket 212, a circular opening 215 in the center portion of the bracket 212. The opening 215 engages a boss 225 so that the gear holder 220 can rotate around the center of the opening 215. The bracket 212 is fixed to the support arm 12 by a bolt 216 screwed into a tapped hole 217 on the support arm 12 through the slot 213 as shown in FIG. 13.

The gear holder 220 is provided with an housing 221 for the pinion 240 and another housing 224 for the rack 230. The pinion housing 221 is formed substantially into a disk and provided with a boss 225. The rack housing 224 is formed into an elongated cube with a length enough for the rack 230 to advance and retreat within the housing.

A recess 227 holding an end of the cable tube 74 is provided at one end of the rack housing 224. A knot 229 of the cable tube 74 engages a groove 228 provided on the surface of the recess 227 so that the cable tube 74 is fitted to the recess 227 in such a manner that the tube 74 cannot slide within the recess 227.

The rack 230 is shaped into an elongated cube and provided with cogs on a side face along the length. The rack 230 is also provided with a slit 231 extending along the length and a rectangular recess 232 into which a block 233 is inserted so that the block 233 can slide within the recess 232. An end piece 235 of the cable 70 engages a recess 234 of the block 233 and the cable 70 is drawn through the slit 231.

The position of the block 233 in the recess 232 can be adjusted with an adjuster bolt 238. The adjuster bolt 238 penetrates the bottom of the rack 230, and the head of the bolt 238 is screwed into the block 233. The adjuster bolt 238 is screwed to adjust the portion of the block 233 within the recess 232.

In this embodiment, the reason why the block 233 is adjusted to adjust the length of the cable 70 inserted into the recess 232 is that the cable 70 can lay suitably without slack between the seat belt retractor 80 and the cable advancing and retreating mechanism 200 regardless of an error of the length of the cable 70 or the tube 74.

Figure 18A:
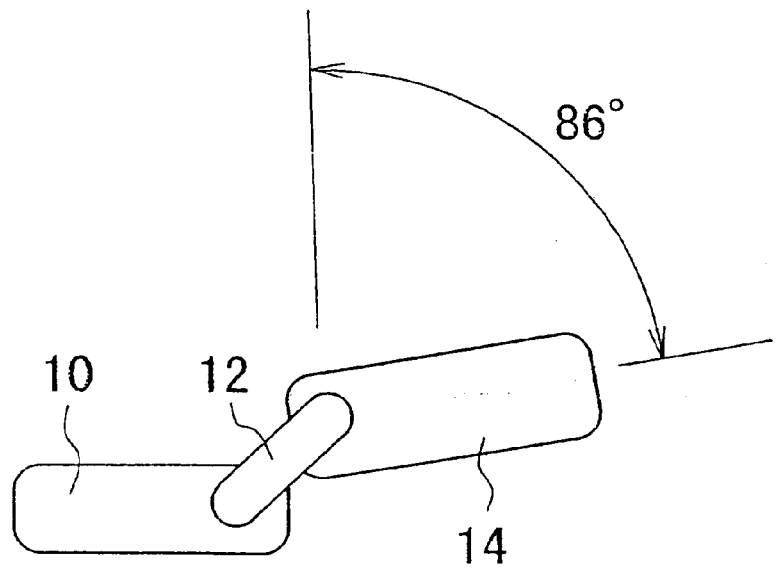

The seat belt retractor 80 and the cable advancing and retreating mechanism 200 are incorporated in the seat. The adjuster bolt 238 is screwed in a direction that the cable 70 is tensioned with the seat inclined fully as shown in FIG. 18a, and positions the block 233 so that the rotor 126 can stand the acceleration sensor 92 vertically.

Both a center hole of the pinion 240 and the circular opening 215 in the disk portion 211 of the fixing piece 210 engage the boss 225 so that the pinion 240 and the disk portion 211 are arranged coaxially. The pin 214 shaped like a crow bent and stood up from the rim of the disk portion 211 is inserted into a circumferential ditch 244. The pin 214 strikes to an end 224a of the circumferential ditch 244 to prevent the pinion 240 from rotating unclockwise shown in FIG. 14.

A holder lid 260 is put over the gear holder 220 containing the rack 230, the pinion 240 and the disk portion 211 with intervention of a slip plate 250, and is fixed by vises. The slip plate 250 and the holder lid 260 are provided with circular openings 255 and 265 arranged coaxially around the boss 225.

The bracket 212 on the fixing piece 210 is in the shape of the letter L and extends outside through the openings 255 and 265. The bracket 212 is fixed to the support arm 12 by the bolt 216 in the manner mentioned above.

The holder lid 260 has two through-holes 261 for bolts. A tip 18f of the pivot shaft 18 is provided with two tapped holes 262 corresponding to the through-holes 261. Bolts 263 are screwed into the tapped holes 262 through the holes 261 so that the gear holder 220 is fixed to the pivot shaft 18. Therefore, the gear holder 220 rotates integrally with the pivot shaft 18. Furthermore, since the pivot shaft 18 rotates integrally with the seat back 14, the gear holder 220 rotates coupled with the seat back 14 inclining forward and rearward.

The components of the seat belt retractor 80 connecting with the upper end of the cable 70 are the same as the components shown in FIG. 1 through FIG. 12b. The upper end of the cable 70 is wound on the wheel 144 and connected to the wheel 144 with the end block 148. The wheel 144 is biased by the return spring 160 in the cable winding direction so that the cable 70 is always drawn toward the retractor 80 away from the cable advancing and retreating mechanism 200.

According to the seat belt device installed with the cable advancing and retreating mechanism 200, the sensor casing 104 of the acceleration sensor 92 is rotated by the attitude control rotor 126 to always stand vertically even when the seat back 14 is inclined rearward just as the seat belt device installed with the cable advancing and retreating mechanism 20.

Figure 17A:
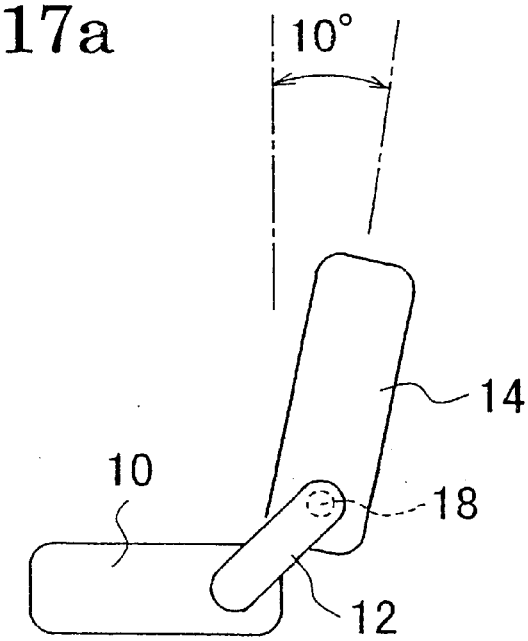
Figure 17B:
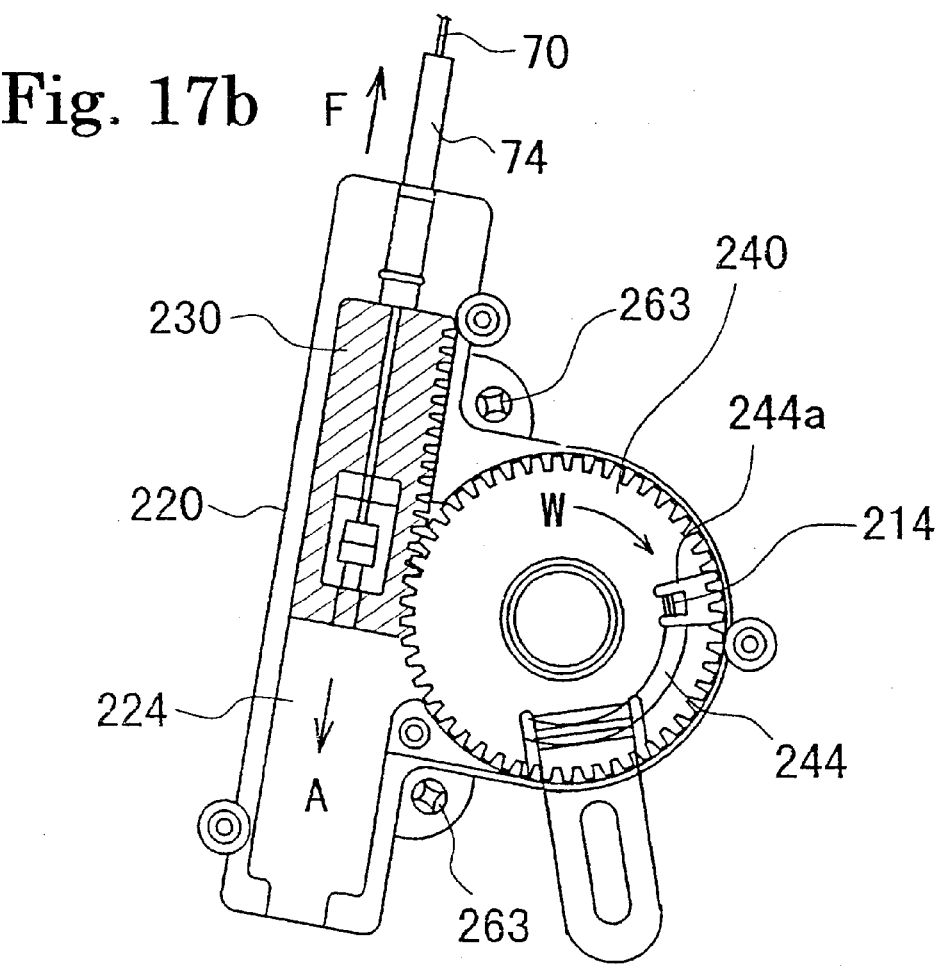

FIGS. 17a, 17b show the state where the seat back 14 is inclined rearward at 10° from the perpendicular direction. In this state, the pin 214 contacts with the end 244a of the circumferential ditch 244.

As mentioned above, even when the pinion 240 applied with a torque in a direction as indicated by the arrow W through the cable 70, the pinion 240 is prevented from rotation in the direction W since the pin 214 strikes to the end 244a of the circumferential ditch 244.

When the seat back 14 is inclined rearward from the state as shown in FIGS. 17a and 17b, the gear holder 220 rotates in clockwise as shown in FIG. 17b. In this case, since the pinion 240 is prevented from rotation in the direction W by the pin 214 striking to the end 244a, the rack 230 slides within the rack housing 224 in a direction A as shown in FIG. 17b and draws the cable 70 so that the wheel 144 of seat belt retractor 80 wound with the upper end of the cable 70 rotates in the manner as FIG. 11b mentioned above. Coupled with rotation of the wheel 144, the attitude control rotor 126 integrated with the wheel 144 rotates and the standing piece 136 engaging with the engaging recess 142 also rotates in the same direction. Therefore, the sensor casing 104 is directed vertically so that the sensor weight 102 is held in the vertically standing attitude as well as the sensor casing 104.

When the seat back 14 is inclined rearward fully as shown in FIG. 18a, the rack 230 shifts to the opposite end in the rack housing 224. In this state, the cable 70 also pulls the attitude control rotor 126 so that the sensor weight 102 is held in the vertical standing attitude as well as the sensor casing 104.

Figure 18B:
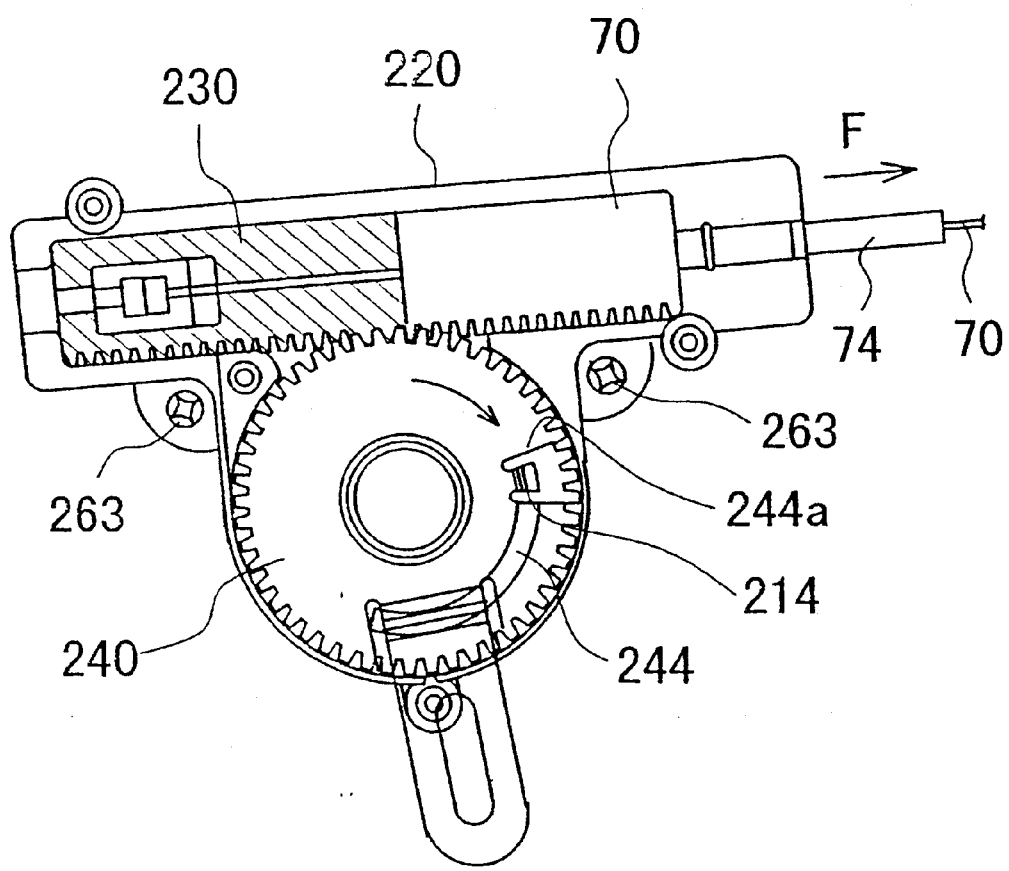
Figure 19A:
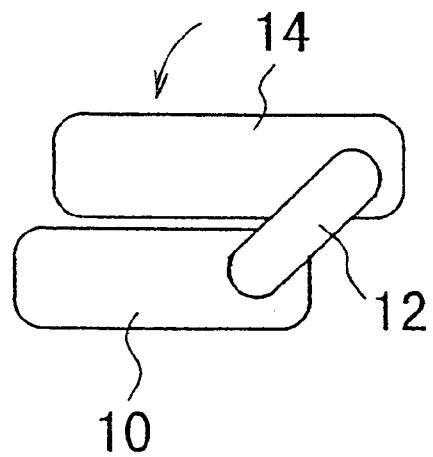
Figure 19B:
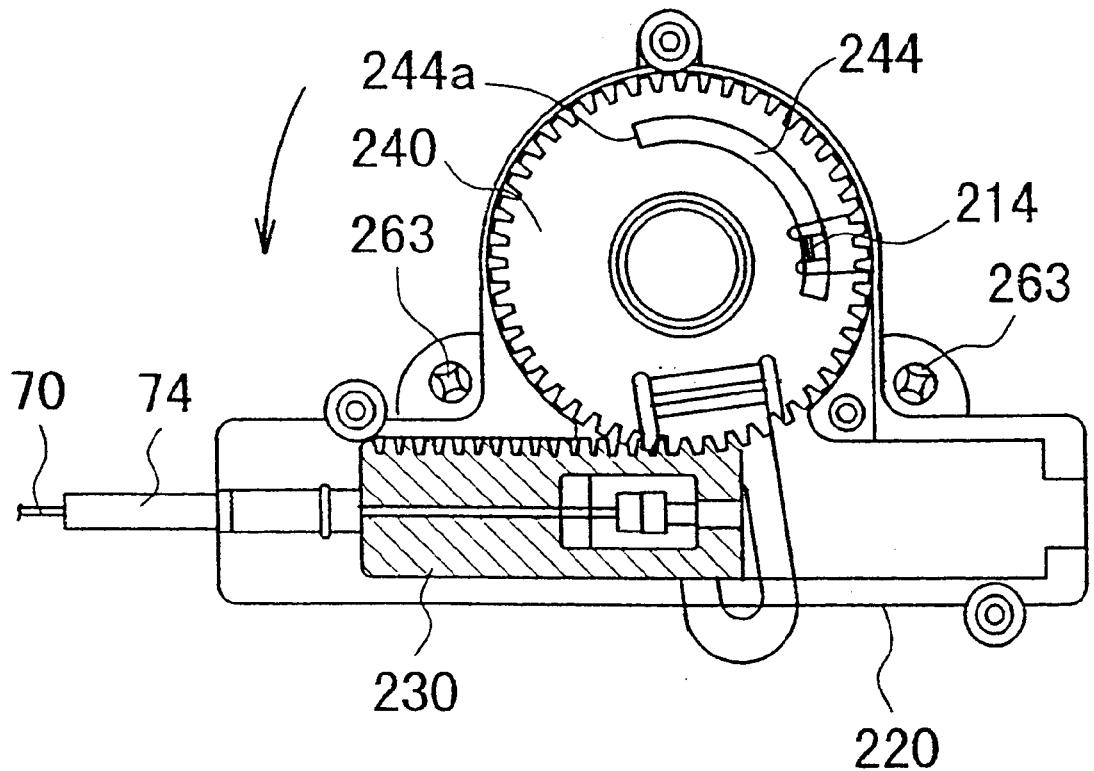

When the seat back 14 is returned to the normal position as shown in FIG. 17a from the state where the seat back 14 is fully inclined rearward as shown in FIG. 18a, the pinion 240 is still prevented from rotation by the pin 214 striking to the end 244a of the circumferential ditch 244 and the rack 230 slides in the direction F coupled with the gear holder 220 rotating counterclockwise from the state of FIG. 18b. Then the cable 70 is advanced out of the cable advancing and retreating mechanism 200 and the wheel 144 rotates counterclockwise as shown in FIG. 17b, 18b. Integrated with the wheel 144, the rotor 126 rotates clockwise and the sensor casing 104 with the standing piece 136 rotates in the same direction so that the sensor casing 104 always stands vertically.

As the seat back 14 is inclined rearward, the slit end 158 of the wheel 144 moves closer to the projection 156 of the holder casing 108 as shown in FIGS. 11a, 11b, 12a and 12b so that the return spring 160 is pressurized.

Conversely, when the seat back 14 is returned to the standing position shown in FIG. 17a from the position shown in FIG. 18a, the wheel 144 is pressed by the return spring 160 so as to smoothly rotate in the counterclockwise direction of FIGS. 11 and 12.

When the seat back 14 is inclined forward to overlaid on the seat cushion 12, the cable 70 is not advanced so that the seat back 14 can be inclined forward to be overlaid on the seat cushion 12 without any obstacle. In this case, since the pinion 240 rotates integrated with the gear holder 220 in such a direction that the end 244a of circumferential ditch 244 is separated from the pin 214, the rack 230 does not move at all to advance or retreat the cable 70.

When the seat back 14 is inclined forward, since the seat is unoccupied and the seat belt retractor 80 is not in use, there is no need to stand the sensor casing 104 vertically.

As apparent from the above description, the seat belt device of the present invention has the seat belt retractor incorporated in the seat back wherein the acceleration sensor stands vertically at any angle of inclination of the seat back. The device absorbs an error of the length of the cable or the tube and holds the acceleration sensor precisely in the vertical direction.

What is claimed is:

1. A seat belt device which is installed in a seat of a vehicle having a seat cushion and a seat back connected pivotably to the seat cushion, comprising:

a seat belt;

a seat belt retractor for retracting the seat belt and incorporated in the seat back;

a cable, one end of which is engaged to the seat belt retractor; and a cable advancing and retreating mechanism attached to a portion where the seat back and the seat cushion are connected to each other, the other end of said cable being engaged to said mechanism, and said mechanism moving the cable corresponding to inclination of the seat back, said seat belt retractor comprising a reel for winding the seat belt, a locking mechanism for locking the reel to rotate in a seat belt withdrawing direction, an acceleration sensor for activating the locking mechanism, a rotor engaged with the acceleration sensor and to which one end of said cable is connected, and a retractor frame in which the reel, the locking mechanism, and the acceleration sensor are assembled and to which said sensor is supported pivotably about a horizontal axis, whereby said cable advancing and retreating mechanism rotates the rotor by way of the cable so that the sensor stands vertically at any angle of inclination of the seat back, wherein said cable advancing and retreating mechanism is provided with a pinion rotating coupled with the seat back and a rack engaging the pinion, wherein said rack comprises a main rack engaging said pinion and a sub rack attached to the main rack so that the position of the sub rack is adjustable along the length of the main rack, and wherein the sub rack is connected with said cable.

2. A seat belt device as claimed in claim 1, wherein said pinion is attached to a pivot shaft integrated with the seat back.

3. A seat belt device as claimed in claim 1, wherein said sensor comprises a sensor casing pivotaly supported to said retractor frame, a sensor weight being accommodated in the sensor casing and capable of tilting, and an arm which is raised by said sensor weight to activate said locking mechanism when the sensor weight tilts.

4. A seat belt device as claimed in claim 3, wherein a holder casing is fixed to said retractor frame, said sensor casing is supported pivotally to the holder casing, said sensor casing has a standing piece standing vertically, said rotor is supported to said holder casing so that the rotor can rotate about an axis of the rotor, said rotor has an overhang overhanging above said standing piece of said sensor casing, and an upper end of the standing piece engages with an engaging recess formed in a lower surface of said overhang so that the sensor casing is rotated by the rotation of the rotor.

5. A seat belt device as claimed in claim 4, wherein there is play between the inner surface of said recess of said overhang and the upper end of said standing piece.

6. A seat belt device which is installed in a seat of a vehicle having a seat cushion and a seat back connected pivotably to the seat cushion, comprising:

a seat belt;

a seat belt retractor for retracting the seat belt and incorporated in the seat back;

a cable, one end of which is engaged to the seat belt retractor; and a cable advancing and retreating mechanism attached to a portion where the seat back and the seat cushion are connected to each other, the other end of said cable being engaged to said mechanism, and said mechanism moving the cable corresponding to inclination of the seat back, said seat belt retractor comprising a reel for winding the seat belt, a locking mechanism for locking the reel to rotate in a seat belt withdrawing direction, an acceleration sensor for activating the locking mechanism, a rotor engaged with the acceleration sensor and to which one end of said cable is connected, and a retractor frame in which the reel, the locking mechanism, and the acceleration sensor are assembled and to which said sensor is supported pivotably about a horizontal axis, whereby said cable advancing and retreating mechanism rotates the rotor by way of the cable so that the sensor stands vertically at any angle of inclination of the seat back, wherein said cable advancing and retreating mechanism is provided with a fixed pinion and a rack which is engaged with the pinion and moves along a perimeter of the pinion when the seat back pivots, wherein said cable is connected to said rack, and wherein said cable is attached to said rack so that the position of the cable is adjusted along the length of the rack.

7. A seat belt device as claimed in claim 6, wherein the pinion is fixed to a support arm of said seat, and the rack is held within a gear holder attached to a pivot shaft integrated with the seat back.

* * * * *